(12) United States Patent
McKinnon et al.

(10) Patent No.: US 8,154,632 B2
(45) Date of Patent: Apr. 10, 2012

(54) DETECTION OF DEFECTIVE PIXELS IN AN IMAGE SENSOR

(75) Inventors: Patrick R. McKinnon, Austin, TX (US); Stephen P. Flosdorf, Round Rock, TX (US); Jingqiang Li, Austin, TX (US)

(73) Assignee: LifeSize Communications, Inc., Austin, TX (US)

( * ) Notice: Subject to any disclaimer, the term of this patent is extended or adjusted under 35 U.S.C. 154(b) by 415 days.

(21) Appl. No.: 12/546,473

(22) Filed: Aug. 24, 2009

(65) Prior Publication Data

US 2011/0043668 A1    Feb. 24, 2011

(51) Int. Cl.
*H04N 9/64* (2006.01)

(52) U.S. Cl. ........................................ 348/246; 348/247

(58) Field of Classification Search .................. None
See application file for complete search history.

(56) References Cited

U.S. PATENT DOCUMENTS

| | | | |
|---|---|---|---|
| 5,854,655 A | 12/1998 | Watanabe et al. | |
| 6,002,433 A | 12/1999 | Watanabe et al. | |
| 6,683,643 B1 | 1/2004 | Takayama et al. | |
| 6,965,395 B1 | 11/2005 | Neter | |
| 7,129,975 B2 | 10/2006 | Levine et al. | |
| 7,202,894 B2 | 4/2007 | Kaplinsky et al. | |
| 7,268,812 B2 | 9/2007 | Sato et al. | |
| 7,589,770 B2 * | 9/2009 | Chan | 348/246 |
| 2007/0058056 A1 | 3/2007 | Kaplinsky et al. | |
| 2007/0091187 A1 | 4/2007 | Lin | |
| 2009/0231473 A1 * | 9/2009 | Shimoozono et al. | 348/246 |

* cited by examiner

*Primary Examiner* — David Ometz
*Assistant Examiner* — Angel L Garces-Rivera
(74) *Attorney, Agent, or Firm* — Meyertons Hood Kivlin Kowert & Goetzel, P.C.; Jeffrey C. Hood

(57) ABSTRACT

A system and method for detecting defective pixels in a sensor. A plurality of pixel values of the sensor may be detected. The values may include those of a first pixel and each nearest neighboring pixel to the first pixel. A second pixel may have the highest value of the neighboring pixels. A third pixel may have the next highest value of the neighboring pixels. A first function may be performed on the second pixel value, producing a first output value. A second function may be performed on the third pixel value, producing a second output value. If the first pixel value is higher than the first output value, or, if the first pixel value is higher than the second output value and the second pixel value is higher than the second output value, it may be determined that the first pixel is defective.

30 Claims, 3 Drawing Sheets

DETECTION OF DEFECTIVE PIXELS IN AN IMAGE SENSOR

FIELD OF THE INVENTION

The present invention relates to image sensors, and in particular to detection of defective pixels in an image sensor.

DESCRIPTION OF THE RELATED ART

The growing fields of digital photography and digital videography typically rely on the use of digital image sensors to detect an image. A digital image sensor typically includes of a field of light sensitive pixels. As it is very difficult to manufacture image sensors that are entirely free from defects, a certain number of defective pixels is generally considered acceptable in the manufacture of digital image sensors as a trade off in exchange for reducing the cost of manufacturing. However, given that every defective pixel may negatively affect every image produced using the image sensor, it is still desirable to minimize the effects of such defective pixels.

One way to account for defective pixels is to calibrate a sensor, initially detecting and subsequently remembering the locations of any defective pixels in the sensor, and adjusting any images on the sensor to accommodate the defective pixels. However, the initial calibration is time consuming, and permanently storing the locations of all the defective pixels in the sensor requires dedicating a certain amount of hardware to the problem. The calibration time and hardware cost are of a particular concern in a high-definition image sensor, e.g., which may have a very large number of pixels. For example, in such a sensor, the acceptable number of defective pixels at manufacture can sometimes range into the thousands. In addition, calibration based techniques do not account for variations in pixel defects under different conditions, such as overall sensor gain and temperature. Thus, the initial calibration may miss certain pixels that are only defective under certain conditions which are different than those at calibration; conversely, the initial calibration may mark as defective certain pixels that, while defective under the calibration conditions, may not be defective under other possible operating conditions. Finally, initial calibration techniques do not account for pixels that, while initially functional, later become defective due to aging.

There are also several on-the-fly methods that involve comparing the value of a given pixel with those of nearby pixels. However, the existing methods in this area are simplistic and typically either have difficulty detecting clusters of defective pixels (i.e., adjacent defective pixels), or have difficulty distinguishing between local texture in an image and clusters of defective pixels, and in some cases have a high rate of false positives. Thus, improvements in the field of defective pixel detection are desired.

SUMMARY OF THE INVENTION

Various embodiments are presented of a system and method for detecting defective pixels in a sensor comprising a plurality of light sensitive pixels. In various embodiments, there may be a method for detecting hot pixels, a method for detecting cold pixels, and/or a method for detecting both hot and cold pixels. Various systems may be adapted to implement each of the methods. In one set of embodiments, each of the methods may be implemented by a system including an input for receiving a plurality of pixel values, a memory coupled to the input for storing the plurality of pixel values, and logic coupled to the memory, which may be configured to implement the method according to various embodiments. Another set of embodiments may include a computer readable memory medium, which may store program instructions executable by a processor to implement the method according to various embodiments. Another set of embodiments includes a camera, including an image sensor comprising a plurality of light-sensitive pixels, a memory coupled to the image sensor, and logic coupled to the image sensor and the memory, where the logic is configured to implement the method according to various embodiments.

The method for detecting defective pixels in a sensor may include detecting a plurality of pixel values, including values of a first pixel and each nearest neighboring pixel to the first pixel. The values of the plurality of pixels may be luminosity values. The pixels of the sensor may be arranged in a square grid pattern. Thus, the nearest neighboring pixels to the first pixel may include the eight nearest neighboring pixels. The pixels of the sensor may all be sensitive to the same color, or the sensor may include pixels for detecting different colors. In one embodiment, the pixels may be arranged in a Bayer pattern. The first pixel may comprise a first color, while the 'nearest neighboring pixels' to the first pixel may be the nearest neighboring pixels in the same color plane (e.g., which sense or detect the same color) as the first pixel. The plurality of pixel values may be stored in a memory, e.g., on a memory medium.

A value of the first pixel may be read from the memory. A value of a second pixel may also be read from the memory, where the value of the second pixel is the highest value among the nearest neighboring pixels to the first pixel. A value of a third pixel may further be read from the memory, where the value of the third pixel is the next highest value among the nearest neighboring pixels to the first pixel.

A first function (e.g., a mathematical function) may be performed on the value of the second pixel, producing a first output value. The first function may include a first multiplier, by which the input value (e.g., the value of the second pixel) may be multiplied, and a first offset value, which may be added to the input value multiplied by the multiplier. If the value of the first pixel is higher than the first output value, it may be determined that the first pixel is defective. The first function (e.g., the first multiplier and first offset values) may be based at least in part on the color that the first pixel senses or detects. The first function may be variable based at least in part on the gain of the sensor. The first function may bias the comparison between the first and second pixels in such a way as to provide an optimal combination of accurate detection of most or all defective (hot) pixels in a sensor with a low rate of false positive detections of defective pixels. In addition to the comparison between the first pixel and the second pixel, which may effectively detect single defective pixels, there may be a comparison between the first and second pixels and the third pixel, which may effectively detect clusters of two adjacent defective pixels. In this case, a second function (e.g., a mathematical function) may be performed on the third pixel, e.g., again in order to bias the comparison in such a way as to provide a good combination of accurate detection with a low false positive rate. The second function may produce a second output value. The second function may be the same function as the first function, or it may be a different function. In other words, the second function may include a second multiplier and a second offset value, which may be the same multiplier and offset value as the first multiplier and first offset value, or may be different. The second function may alternatively be a function of an entirely different form than the first function. If the value of the first pixel is higher than the second output value and the value of the second pixel is also higher than the second output value, it may be determined that the first pixel is defective. In some embodiments, in this case it may also be determined that the second pixel is also defective.

The above described method may be used to detect hot pixels in an image sensor. Alternatively, several of the steps may be substituted with those described below for detecting cold pixels in an image sensor. Additionally, all of the steps may be used together to form a cohesive method to detect both hot and cold defective pixels in an image sensor.

A value of a fourth pixel may be read from the memory, where the value of the fourth pixel is the lowest value among the nearest neighboring pixels to the first pixel. A value of a fifth pixel may also be read from the memory, where the value of the fifth pixel is the next lowest value among the nearest neighboring pixels to the first pixel.

A third function (e.g., a mathematical function) may be performed on the value of the fourth pixel, producing a third output value. The third function may include a third multiplier, by which the input value (e.g., the value of the fourth pixel) may be multiplied, and a third offset value, which may be added to the input value multiplied by the multiplier. If the value of the first pixel is lower than the third output value, it may be determined that the first pixel is defective. The third function (e.g., the third multiplier and third offset values) may be based at least in part on the color that the first pixel senses or detects. The third function may be variable based at least in part on the gain of the sensor. The third function may bias the comparison between the first and fourth pixels in such a way as to provide an optimal combination of accurate detection of most or all defective (cold) pixels in a sensor with a low rate of false positive detections of defective pixels. In addition to the comparison between the first pixel and the fourth pixel, which may effectively detect single defective (cold) pixels, there may be a comparison between the first and fourth pixels and the fifth pixel, which may effectively detect clusters of two adjacent defective pixels. In this case, a fourth function (e.g., a mathematical function) may be performed on the fifth pixel, e.g., again in order to bias the comparison in such a way as to provide a good combination of accurate detection with a low false positive rate. The fourth function may produce a fourth output value. The fourth function may be the same function as the third function, or it may be a different function. In other words, the fourth function may include a fourth multiplier and a fourth offset value, which may be the same multiplier and offset value as the third multiplier and third offset value, or may be different. The fourth function may alternatively be a function of an entirely different form than the third function. If the value of the first pixel is lower than the fourth output value and the value of the fourth pixel is also lower than the fourth output value, it may be determined that the first pixel is defective. In some embodiments, in this case it may also be determined that the fourth pixel is also defective.

If none of the above described comparisons result in a determination that the first pixel is defective, it may be determined that the first pixel is not defective. Thus, if the value of the first pixel is not higher than the first output value, and if the value of the first pixel is not higher than the second output value and the value of the second pixel is not also higher than the second output value, and if the value of the first pixel is not lower than the third output value, and if the value of the first pixel is not lower than the fourth output value and the value of the fourth pixel is not also lower than the fourth output value, then it may be determined that the first pixel is not defective.

It should also be noted that in some embodiments, if the first pixel is defective and at least one of the nearest neighboring pixels is also defective, it may be determined that the sensor has a defective cluster. The defective cluster may include the first pixel and the at least one defective nearest neighboring pixel.

The system and method may provide several benefits over existing methods of defective pixel detection. One advantage is that only a few (e.g., in some embodiments, as few as 9) pixel values need to be stored at a time, because the method only requires values for a pixel and its nearest neighboring pixels. Another advantage is that the method can effectively detect clusters of defective pixels, because of the second comparison. Furthermore, because the functions for biasing the pixel value comparisons can be calibrated and adjusted as appropriate, the system and method may provide a high detection rate with relatively few false alarms. In other words, the first and second comparisons, combined with the use of functions for biasing the comparisons, effectively detect defective pixels while also effectively distinguishing between such defects and variations in local texture or minor variations in pixel sensitivity, thereby largely avoiding falsely determining that neighboring pixels with minor value differences due to such minor variations in local texture or pixel sensitivity are defective.

BRIEF DESCRIPTION OF THE DRAWINGS

A better understanding of the present invention can be obtained when the following detailed description of the preferred embodiment is considered in conjunction with the following drawings, in which:

FIGS. 3A-3D illustrate several possible patterns of defective pixels in an image sensor in a Bayer pattern;

Figure 1:
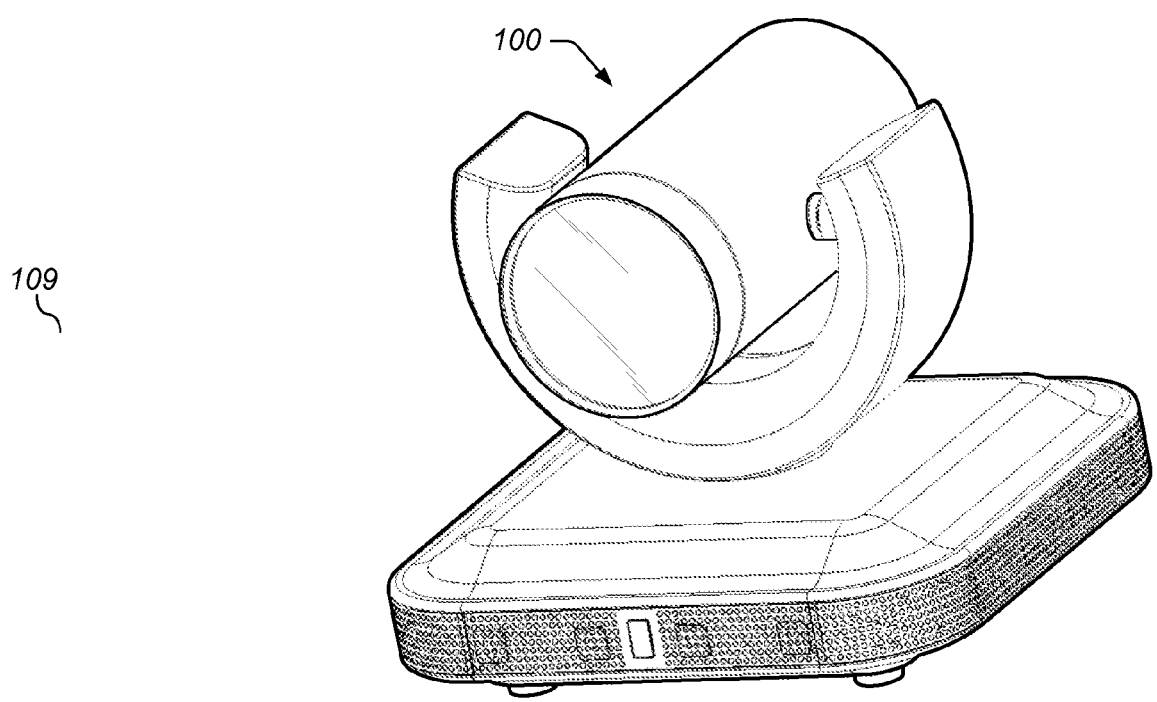
FIG. 1 illustrates an exemplary camera including an image sensor according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; or a non-volatile memory such as a PROM, EPROM, EEPROM, flash memory, or magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

FIG. 1—Camera Including an Image Sensor

FIG. 1 illustrates an exemplary camera 100 according to one embodiment of the present invention. The camera 100 may include a lens and one or more image sensing devices, such as a charge-coupled device (CCD) sensor or a complementary metal-oxide-semiconductor (CMOS) sensor. The camera 100 may be a digital still camera or a digital video camera. The camera 100 may be a high definition (HD) camera or a standard definition camera (SD). In general, the camera 100 may be any sort of camera with at least one image sensor including a plurality of light sensitive pixels, e.g., a digital image sensor.

The image sensor may include pixels sensitive to one or more colors. For example, the image sensor may include pixels laid out in a Bayer pattern, i.e., a square grid with rows of alternating red- and green-light sensitive pixels, alternated with rows of alternating green- and blue-light sensitive pixels. Alternatively, the image sensor may include pixels sensitive to any kind of colors and/or laid out in any geometric pattern; e.g., RGBE, CYGM, monochromatic (grayscale, blue, red, green, etc).

An image sensor will often include one or more defective pixels. Defective pixels may include hot, warm, cool, or cold pixels, as they may variously be referred to. These include pixels which are 'always on' (hot), i.e., which always record a maximum light value, pixels which are 'always off' (cold), i.e., which always record a minimum (or no) light value, and pixels with varying degrees of higher than average (warm) or lower than average (cool) sensitivity to light. Defective pixels may be permanently defective, or in some cases, may be simply 'stuck', i.e., may be temporarily defective. In general, a defective pixel is any pixel whose light-sensitivity falls outside of a threshold range considered normal for pixels in that image sensor and of the same color sensitivity. Defective pixels, if allowed in an image sensor with no means of correcting or adjusting for them, may significantly reduce the quality and fidelity of an image sensed by the image sensor, and are thus undesirable.

An image sensor may include defective pixels immediately from being manufactured, and/or may develop defective pixels later, e.g., after use. Although manufacturers may make an effort to reduce or eliminate defective pixels in manufacturing, a certain number of defective pixels may be allowed in order to keep manufacturing costs down. However, it is typical that image sensors with clusters of three or more defective pixels adjacent in a color plane will not be allowed, e.g., will not be sold or distributed by manufacturers. Thus, a given camera's image sensor may typically include clusters of up to (but not more than) two defective pixels adjacent in a color plane. It may be desirable to detect any such defective pixels of a camera's image sensor, whether occurring singly or in clusters, "on the fly"—that is, continuously, as the image sensor detects an image and the camera processes the image.

The camera may thus also include a memory and logic for such (and potentially other) image processing functions. The logic may be any kind of logic, including analog logic, digital logic, a processor and memory (such as a CPU, DSP, microcontroller, etc.), an ASIC (application specific integrated circuit), a programmable hardware element, such as an FPGA (field programmable gate array), or any combination of the above. In one embodiment, the image sensor may detect an image, i.e., detect a value (e.g., a luminosity value and/or a chrominance value) for some or all of the light sensitive pixels in the image sensor, which may then be stored in the memory. The logic may be configured to perform a defective pixel detection algorithm on each pixel based on the recorded pixel values, e.g., as set forth below with respect to FIG. 2 according to various embodiments.

Figure 2:
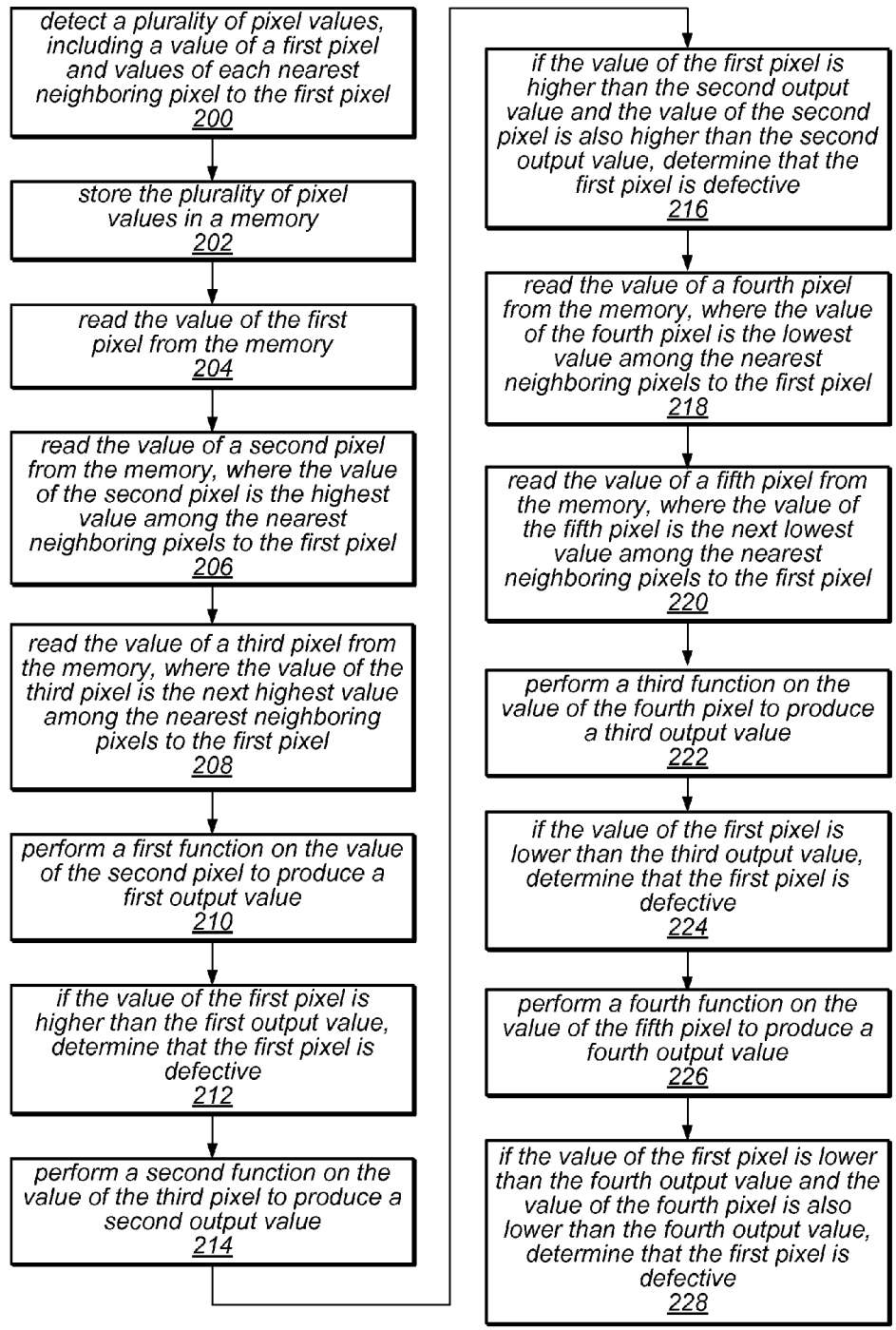
FIG. 2 is a flowchart diagram illustrating a method for detecting defective pixels according to one embodiment.

FIG. 2—Method for Detecting Defective Pixels

FIG. 2 is a flowchart diagram illustrating a method for detecting defective pixels in an image sensor including a plurality of light sensitive pixels. The method may be performed within a camera, e.g., on the fly, by hardware (e.g., an FPGA or ASIC) or by software (e.g., a processor and memory medium). Alternatively, part or all of the method may be performed on an image (or image portion) at a later time, e.g., on a different device (e.g., on a home computer with image processing software). In some embodiments, one of more of the steps described below may be skipped, repeated, or performed in a different order than shown, as desired.

In 200, a plurality of pixel values are detected, including a value of a first pixel and values of each nearest neighboring pixel to the first pixel. The 'nearest neighboring pixels' to the first pixel may be the nearest pixels to the first pixel in the same color plane as the first pixel. For example, if the pixels are arranged in a Bayer pattern, there may be a repeating pattern of blue, red, and green pixels in a square grid arrangement. In this case, the nearest neighboring pixels in the same color plane to a blue pixel may not literally be the nearest neighboring pixels, e.g., the blue pixel may be immediately surrounded by green and red pixels; in this case the nearest neighboring pixels of the same color plane would be the 8 blue pixels of the 16 next nearest pixels. It should be noted that although in a Bayer pattern there are twice as many green pixels as red or blue pixels, the green pixels in the same rows as the blue pixels may be treated as a different color plane than the green pixels in the same rows as the red pixels. These color planes may be distinguished herein as Gb (green in blue rows) and Gr (green in red rows). It should also be noted that, although in a multi-color image sensor, the 'nearest neighboring pixels' may be those nearest pixels of the same color plane and may not be the literal nearest neighboring pixels, in other embodiments (e.g., in a monochromatic sensor) the nearest neighboring pixels may indeed be the literal nearest neighboring pixels. In some embodiments, the 'nearest neighboring pixels' may be the literal nearest neighboring pixels regardless of the relative color plane. However, due to typical differences in sensitivity between pixels of different colors, this may be relatively rare in polychromatic sensors, and in some cases, less effective.

In 202, the plurality of pixel values may be stored in a memory. The memory may be any kind memory medium, as defined above. In one embodiment, the pixel values may be stored in hardware registers, e.g., by hardware specifically designed to perform a defective pixel detection algorithm. In this case, it may be that only the plurality of pixel values including the first pixel value and the nearest neighboring pixel values may be stored at a given time, or some other subset of the values of the pixels in the image sensor; it is also possible that all of the pixel values of the sensor may be stored. In one embodiment, the pixel values may be stored as part of a complete image, e.g., may be part of a picture taken by the camera, and may be stored on flash memory (or any other kind of memory).

In 204, the value of the first pixel may be read from the memory.

In 206, the value of a second pixel may be read from the memory. The value of the second pixel may be the highest value among the nearest neighboring pixels to the first pixel. In other words, the second pixel may be the brightest pixel of the pixels nearest the first pixel.

In 208, the value of a third pixel may be read from the memory. The value of the third pixel may be the next highest value among the nearest neighboring pixels to the first pixel. In other words, the third pixel may be the second brightest pixel of the pixels nearest the first pixel, after the second pixel.

In 210, a first function may be performed on the value of the second pixel to produce a first output value. The first function may be a mathematical function; for example, the first function may include a first multiplier and a first offset value. In other words, the first function might be a linear function such as:

$$F_1(x)=ax+b$$

where $F_1(x)$ is the first output value, a is the first multiplier, x is the input value (e.g., the value of the second pixel), and b is the first offset value. Alternatively, the function may take any number of forms, e.g., may be any type of mathematical function.

In 212, if the value of the first pixel is higher than the first output value, it may be determined that the first pixel is defective. Unless the first pixel is defective, it is reasonable to expect that the first pixel should not be significantly brighter than the second pixel. The first function may be used to bias the comparison, thereby ensuring that the first pixel is not simply detecting local texture in the image, or that the difference between the first pixel value and the second pixel value falls within an acceptable range of sensitivity variation. The specific function used may depend on several factors, according to various embodiments. For example, the first function may always take the same general form (e.g., the linear function shown above) but the coefficient and offset values may be different for pixels of different colors, and/or may be adjusted based on an adjustment in overall gain of the image sensor. Additionally, environmental factors such ambient temperature may affect pixel sensitivity, and may therefore in some embodiments affect the values of the multiplier and/or the offset. Optimal values for the multiplier and offset may be determined experimentally, e.g., by testing different ranges of possible values and determining which values produce an optimal balance of a high defect detection rate with a low false positive detection rate.

Thus, by comparing the values of the first and second pixels (modified by the first function to allow for local texture and acceptably small variations in sensitivity), it may be determined if the first pixel is defective. However, if the first and second pixel are both defective, for example, if both the first and second pixel are hot, the values of the first and second pixel may still fall within the acceptable range of variation relative to each other, and neither pixel will be marked as defective by this first comparison. Thus, the method may include a second comparison, e.g., in step 216.

The second function may be a mathematical function; for example, like the first function, the second function may include a multiplier and an offset value. In other words, the second function might also be a linear function such as:

$$F_2(x)=cx+d$$

where $F_2(x)$ is the second output value, c is the second multiplier, x is the input value (e.g., the value of the third pixel), and d is the second offset value. In some embodiments, the second function may be the same as the first function; for example, c may be the same multiplier as a, while b may be the same offset as d.

In 216, if the value of the first pixel is higher than the second output value and the value of the second pixel is also higher than the second output value, it may be determined that the first pixel is defective. In other words, if both the first and second pixels are hot, comparing their values with the value of the next brightest pixel may show this. The second function may be used to bias the comparison, thereby ensuring that the first and second pixels are not simply detecting local texture in the image, or within an acceptable range of sensitivity variation. As noted above, the second function may be the same as the first function; in other words, the same function may be equally effective in biasing the first comparison (between the value of the first pixel and the value of the second pixel) and the second comparison (between the values of the first and second pixels and the value of the third pixel). In some embodiments, though, the second function may be different than the first function, for example, a different multiplier and/or a different offset value may be used for comparing the first and second pixels with the third pixel. For example, in some embodiments, a greater range of variation may be acceptable between the first pixel and the third pixel than between the first pixel and the second pixel, and/or between the second pixel and the third pixel. In some embodiments, if the value of the first pixel is higher than the second output value and the value of the second pixel is also higher than the second output value, it may also be determined that the second pixel is defective (hot), and/or that the first and second pixel comprise a defective pixel cluster. However, in some embodiments such a determination may not be made based on this condition; for example, a determination of whether the second pixel is normal or defective may be made independently, e.g., at a separate time by means of the same algorithm.

Thus, by performing a first comparison of a first pixel to its brightest neighboring pixel, and also performing a second comparison of the first pixel and its brightest neighboring pixel to the next brightest neighboring pixel, both single defective pixels and clusters of two defective (hot) pixels can be detected. It will be noted that if the first, second, and third pixel are all hot, this may present a problem. However, as noted above, in many cases, it may be reliably assumed that the image sensor does not contain clusters of three or more defective pixels adjacent in any given color plane. Many manufacturers implement quality standards such that sensors with clusters of three or more defective pixels adjacent in any given color plane are not allowed; thus, if such a standard is in effect (as is currently the norm), it can be reliably assumed that the image sensor is very unlikely to have such clusters, and the first and second comparisons may be sufficient to detect substantially all hot pixels and clusters.

If the first pixel does not meet the conditions described above for determining a hot pixel, the first pixel may not be marked as hot. More specifically, if the value of the first pixel is not higher than the first output value, and if the value of the first pixel is not higher than the second output value and the value of the second pixel is not also higher than the second output value, it may be determined that the first pixel is not hot.

The steps of the method as described above according to various embodiments may be performed as a complete method, e.g., a method for detecting hot (or warm) pixels in an image sensor. Similarly, the steps 200 through 204, together with steps 218 through 228 (described below) may be performed (e.g., without steps 206 through 216), according to the various embodiments described, as an independent method for detecting cold (or cool) pixels in an image sensor. Alternatively, most or all of the steps may be performed as a method for detecting both hot and cold (e.g., all defective) pixels in an image sensor. In addition, other step combinations and orders may also be used, as desired.

In 218, the value of a fourth pixel may be read from the memory. The value of the fourth pixel may be the lowest value among the nearest neighboring pixels to the first pixel. In other words, the fourth pixel may be the dimmest pixel of the pixels nearest the first pixel.

In 220, the value of a fifth pixel may be read from the memory. The value of the fifth pixel may be the next lowest value among the nearest neighboring pixels to the first pixel. In other words, the third pixel may be the second dimmest pixel of the pixels nearest the first pixel, after the fourth pixel.

In 222, a third function may be performed on the value of the fourth pixel to produce a third output value. The third function may be a mathematical function; for example, the third function may include a third multiplier and a third offset value. In other words, the third function might be a linear function of a similar form as the first and second functions described above, with respective third multiplier and third offset values. Alternatively, the function may take any number of forms, e.g., may be any type of mathematical function.

In 224, if the value of the first pixel is lower than the third output value, it may be determined that the first pixel is defective. Similarly to step 212, unless the first pixel is defective, it is reasonable to expect that the first pixel should not be significantly dimmer than the fourth pixel. The third function may be used to bias the comparison, thereby ensuring that the first pixel is not simply detecting local texture in the image, or that the difference between the first pixel value and the fourth pixel value falls within an acceptable range of sensitivity variation. The specific form and constant values of the third function may depend on similar factors as the form and constant values of the first function. For example, in one embodiment, the form may typically be the same (e.g., a linear function such as described above) while the constants (e.g., the multiplier/coefficient and the offset value) and may be experimentally determined. The values of the constants may also be adjustable based on various conditions, similarly as described with respect to step 212. In some embodiments, the first and third functions may be the same, although this may be atypical; in many embodiments, at least the values of the third multiplier and/or the third offset may be different than the values of the first multiplier and the first offset.

Thus, by comparing the values of the first and fourth pixels (modified by the third function to allow for local texture and acceptably small variations in sensitivity), it may be determined if the first pixel is defective. However, if the first and fourth pixel are both defective, for example, if both the first and fourth pixel are cold, the values of the first and fourth pixel may still fall within the acceptable range of variation, and neither pixel will be marked as defective by this comparison. Thus, the method may include an additional comparison, e.g., in step 228.

The fourth function may be a mathematical function; for example, like the third function, the fourth function may include a multiplier and an offset value. In other words, the fourth function might also be a linear function of the form shown above, with respective fourth multiplier and fourth offset values. In some embodiments, the fourth function may be the same as the third function; for example, the fourth multiplier may be the same as the third multiplier, while the fourth offset value may the same as the third offset value. The third and fourth functions may alternatively be different, either in terms of overall form, or simply in terms of the values of the multipliers and/or offsets. In general, the fourth function may take any number of forms, e.g., may be any type of mathematical function.

In 228, if the value of the first pixel is lower than the fourth output value and the value of the fourth pixel is also lower than the fourth output value, it may be determined that the first pixel is defective. In other words, if both the first and fourth pixels are cold, comparing their values with the value of the next dimmest pixel may show this. The fourth function may be used to bias the comparison, thereby ensuring that the first and fourth pixels are not simply detecting local texture in the image, or within an acceptable range of sensitivity variation. As noted above, the fourth function may be the same as the third function; in other words, the same function may be equally effective in biasing the third comparison (between the value of the first pixel and the value of the fourth pixel) and the fourth comparison (between the values of the first and fourth pixels and the value of the fifth pixel). In some embodiments, though, the fourth function may be different than the third function, for example, a different multiplier and/or a different offset value may be used for comparing the first and fourth pixels with the fifth pixel. For example, in some embodiments, a greater range of variation may be acceptable between the first pixel and the fifth pixel than between the first pixel and the fourth pixel, and/or between the fourth pixel and the fifth pixel. In some embodiments, if the value of the first pixel is lower than the fourth output value and the value of the fourth pixel is also lower than the fourth output value, it may also be determined that the fourth pixel is defective (cold), and/or that the first and fourth pixel comprise a defective pixel cluster. However, in some embodiments such a determination may not be made based on this condition; for example, a determination of whether the fourth pixel is normal or defective may be made independently, e.g., at a separate time by means of the same algorithm.

Thus, by performing a comparison of a first pixel to its dimmest neighboring pixel, and also performing an additional comparison of both the first pixel and its dimmest neighboring pixel to the next dimmest neighboring pixel, both single defective pixels and clusters of two defective (cold) pixels can be detected. As with hot pixel detection, it will again be noted that if the first, fourth, and fifth pixel are all cold, this may present a problem. However, as noted above, in many cases, it may be reliably assumed that the image sensor does not contain clusters of three or more defective pixels adjacent in any given color plane; thus, the first and second comparisons may be sufficient to detect substantially all hot pixels and clusters.

If the first pixel does not meet the conditions described above for determining a cold pixel, the first pixel may not be marked as cold. More specifically, if the value of the first pixel is not lower than the third output value, and if the value of the first pixel is not lower than the fourth output value and the value of the fourth pixel is not also lower than the fourth output value, it may be determined that the first pixel is not cold. If it has also been determined that the first pixel is not hot (e.g., as described with respect to step 216), it may be determined that the first pixel is not defective (e.g., neither hot nor cold).

FIG. 3—Defective Pixel Patterns in a Bayer Pattern

Figure 3A:
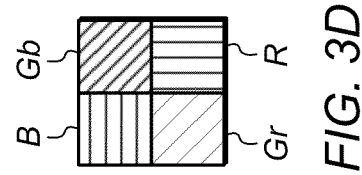
Figure 3A:
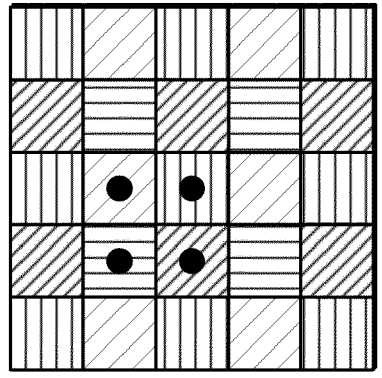
Figure 3B:
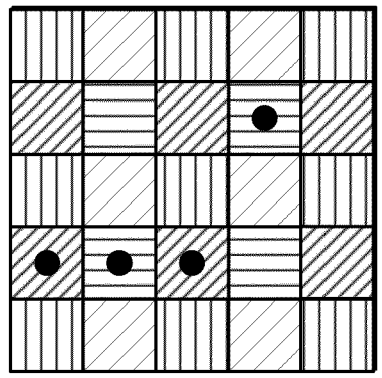
Figure 3C:
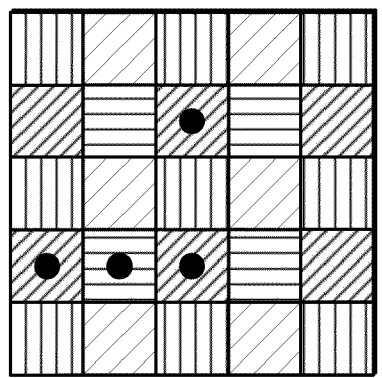

FIGS. 3A-3C show possible arrangements of defective pixels that might exist in a sensor whose pixels are arranged in a Bayer pattern. FIG. 3D is a legend defining the hatching that represents pixels in various color planes in FIGS. 3A-3C. As shown, horizontal hatching is used to represent pixels in the blue color plane (B), vertical hatching is used to represent pixels in the red color plane (R), and diagonal hatching is used represent pixels in green color planes. More specifically, closely spaced diagonal hatching is used to represent pixels in the green-in-blue-rows color plane (Gb) and widely spaced diagonal hatching is used to represent pixels in the green-in-red-rows color plane (Gr).

In 3A, there are four adjacent defective pixels. However, there is only one defective pixel in each color plane (B, Gb, Gr, and R), so the pixels are not considered to be 'clustered'; that is, there are not multiple defective pixels adjacent in any given color plane. This arrangement of defective pixels may meet the quality control standards of many sensor manufacturers, and thus could occur in an image sensor. Thus, a defective pixel detection algorithm should be able to detect each of these defective pixels. The method described with respect to FIG. 2, used appropriately, can detect each of these defective pixels.

In 3B, there are four defective pixels, including two defective pixels adjacent in the R color plane and two defective pixels adjacent in the Gb color plane. Thus, there are two clusters of two defective pixels. This arrangement of defective pixels may meet the quality control standards of many sensor manufacturers, and thus could occur in an image sensor. Thus, a defective pixel detection algorithm should be able to detect each of these defective pixels. The method described with respect to FIG. 2, used appropriately, can detect each of these defective pixels.

In 3C, there are four defective pixels, including three defective pixels adjacent in the Gb color plane and an individual defective pixel in the R color plane. The three defective pixels in the Gb color plane constitute a cluster of three defective pixels adjacent in a color plane, and thus may typically not be allowed by the quality control standards of many sensor manufacturers. Thus, this arrangement of defective pixels may be unlikely to occur in an image sensor, and a defective pixel detection algorithm may not need to be able to detect the defective pixels in this arrangement. The method described with respect to FIG. 2, used appropriately, may or may not be able to detect each of these defective pixels. For example, if at least one of the pixels in the cluster is hot and at least one of the pixels in the cluster is cold, the method may be able to detect that each of the defective pixels is defective. On the other hand, if all three pixels in the cluster are hot, or all three are cold, it is possible that the algorithm may not be able to detect that each of the defective pixels is defective.

Figure 4:
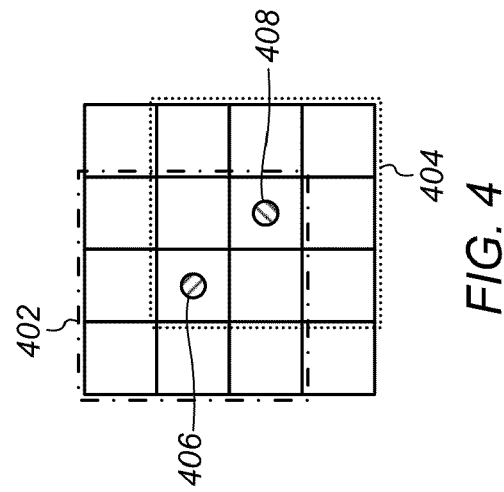
FIG. 4 illustrates the arrangement of a defective pixel and its nearest neighboring pixels in a given color plane according to one embodiment.

FIG. 4—Defective Pixel Detection Pattern

FIG. 4 illustrates a detection pattern by which the method of FIG. 2 may be used to determine the defective or normal nature of a plurality of pixels. For example, the method of FIG. 2 may be used in the way described below to determine whether each pixel in a sensor with a plurality of pixels is either normal or defective.

Each square in FIG. 4 may represent a pixel. All of the pixels shown in FIG. 4 may be in the same color plane. The values of the pixels may be stored in a memory (e.g., in a hardware register or other memory medium) sequentially. After a certain number of pixel values are added to the memory, there may be enough information stored in the memory to perform the method of FIG. 2 on a pixel. After one or more additional pixel values are added to the memory, there may be enough information stored in the memory to perform the method of FIG. 2 on another pixel. Eventually, the initially stored pixel values may no longer be necessary to evaluate whether the next pixel is defective and normal. In this case, the portions of the memory not needed for the current pixel evaluation may be discarded or written over.

As one example, in FIG. 4, pixel 406 may be a defective pixel. The pixel values necessary to perform the method of FIG. 2 may be those of the plurality of pixels 402. In one embodiment, the values may be stored in the memory in rows, from left to right, with each row stored sequentially from top to bottom. Thus, once the value of the pixel 408 has been stored, i.e., all of the values of the plurality of pixels 402 may be stored in the memory, there is sufficient information to evaluate the pixel 406. Additional pixel values may then be stored, and additional pixels may be evaluated as normal or defective. Thus, in this embodiment, the pixel 408 may not itself be evaluated until the value of each pixel in the plurality of pixels 404 has been stored. It should further be noted that in this case, the top row of pixels may not be necessary for the evaluation of the pixel 408, and thus in some embodiments, the values of these pixels may be discarded or overwritten with other information (e.g., other pixel values). It should be noted that these embodiments are exemplary only, and any other means or manners of implementing the method of FIG. 2, in addition to or in place of those just described, are also possible.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for detecting hot pixels in a sensor which senses a plurality of pixels, comprising:
   detecting a plurality of pixel values, the plurality of pixel values comprising values of a first pixel and each nearest neighboring pixel to the first pixel;
   storing the plurality of pixel values in a memory;
   reading a value of the first pixel from the memory;
   reading a highest value among nearest neighboring pixels to the first pixel from the memory, wherein the highest value is a value of a second pixel;
   reading a next highest value among the nearest neighboring pixels to the first pixel from the memory, wherein the next highest value is a value of a third pixel;
   performing a first function on the value of the second pixel, wherein the first function produces a first output value;
   if the value of the first pixel is higher than the first output value, determining that the first pixel is hot;
   performing a second function on the value of the third pixel, wherein the second function produces a second output value;

if the value of the first pixel is higher than the second output value and the value of the second pixel is also higher than the second output value, determining that the first pixel is hot.

2. The method of claim 1,
wherein the first function and the second function are the same function.

3. The method of claim 1,
wherein the first function comprises a first multiplier and a first offset, wherein the second function comprises a second multiplier and a second offset.

4. The method of claim 1,
wherein the first function and the second function are variable based at least in part on the gain of the sensor.

5. The method of claim 1,
wherein the first pixel represents a first color;
wherein the nearest neighboring pixels comprise the nearest neighboring pixels which also sense the first color.

6. The method of claim 1,
wherein the pixels are arranged in a square grid;
wherein the nearest neighboring pixels comprise the eight nearest neighboring pixels.

7. The method of claim 1,
wherein the pixels are arranged in a Bayer pattern;
wherein the nearest neighboring pixels comprise the nearest neighboring pixels in the same color plane as the first pixel.

8. The method of claim 1,
wherein the plurality of pixel values are luminosity values.

9. The method of claim 1,
wherein the first pixel represents a first color;
wherein the first function and the second function are based at least in part on the first color.

10. The method of claim 1, further comprising:
if the first pixel is defective and at least one of the nearest neighboring pixels is also defective, determining that the sensor has a defective cluster comprising the first pixel and the at least one nearest neighboring pixel.

11. A method for detecting cold pixels in a sensor which senses a plurality of pixels, comprising:
detecting a plurality of pixel values, the plurality of pixel values comprising values of a first pixel and each nearest neighboring pixel to the first pixel;
storing the plurality of pixel values in a memory;
reading a value of the first pixel from the memory;
reading a lowest value among nearest neighboring pixels to the first pixel from the memory, wherein the lowest value is a value of a second pixel;
reading a next lowest value among the nearest neighboring pixels to the first pixel from the memory, wherein the next lowest value is a value of a third pixel;
performing a first function on the value of the second pixel, wherein the first function produces a first output value;
if the value of the first pixel is lower than the first output value, determining that the first pixel is cold;
performing a second function on the value of the third pixel, wherein the second function produces a second output value;
if the value of the first pixel is lower than the second output value and the value of the second pixel is lower than the second output value, determining that the first pixel is cold.

12. The method of claim 11,
wherein the first function and the second function are the same function.

13. The method of claim 11,
wherein the first function comprises a first multiplier and a first offset, wherein the second function comprises a second multiplier and a second offset.

14. The method of claim 11,
wherein the first function and the second function are variable based at least in part on the gain of the sensor.

15. The method of claim 11,
wherein the first pixel represents a first color;
wherein the nearest neighboring pixels comprise the nearest neighboring pixels which also sense the first color.

16. The method of claim 11,
wherein the pixels are arranged in a square grid;
wherein the nearest neighboring pixels comprise the eight nearest neighboring pixels.

17. The method of claim 11,
wherein the pixels are arranged in a Bayer pattern;
wherein the nearest neighboring pixels comprise the nearest neighboring pixels in the same color plane as the first pixel.

18. The method of claim 11,
wherein the plurality of pixel values are luminosity values.

19. The method of claim 11,
wherein the first pixel represents a first color;
wherein the first function and the second function are based at least in part on the first color.

20. The method of claim 11, further comprising:
if the first pixel is defective and at least one of the nearest neighboring pixels is also defective, determining that the sensor has a defective cluster comprising the first pixel and the at least one nearest neighboring pixel.

21. A method for detecting defective pixels in a sensor which senses a plurality of pixels, comprising:
detecting a plurality of pixel values, the plurality of pixel values comprising values of a first pixel and each nearest neighboring pixel to the first pixel;
storing the plurality of pixel values in a memory;
reading a value of the first pixel from the memory;
reading a highest value among the nearest neighboring pixels to the first pixel from the memory, wherein the highest value is a value of a second pixel;
reading a next highest value among the nearest neighboring pixels to the first pixel from the memory, wherein the next highest value is a value of a third pixel;
performing a first function on the value of the second pixel, wherein the first function produces a first output value;
if the value of the first pixel is higher than the first output value, determining that the first pixel is hot;
performing a second function on the value of the third pixel, wherein the second function produces a second output value;
if the value of the first pixel is higher than the second output value and the value of the second pixel is also higher than the second output value, determining that the first pixel is hot;
reading a lowest value among the nearest neighboring pixels to the first pixel from the memory, wherein the lowest value is a value of a fourth pixel;
reading a next lowest value among the nearest neighboring pixels to the first pixel from the memory, wherein the next lowest value is a value of a fifth pixel;
performing a third function on the value of the fourth pixel, wherein the third function produces a third output value;
if the value of the first pixel is lower than the third output value, determining that the first pixel is cold;

performing a fourth function on the value of the fifth pixel, wherein the fourth function produces a fourth output value;

if the value of the first pixel is lower than the fourth output value and the value of the fourth pixel is lower than the fourth output value, determining that the first pixel is cold.

22. The method of claim 21, further comprising:
if the value of the first pixel is not higher than the first output value; and
if the value of the first pixel is not higher than the second output value and the value of the second pixel is not also higher than the second output value; and
if the value of the first pixel is not lower than the third output value; and
if the value of the first pixel is not lower than the fourth output value and the value of the fourth pixel is not also lower than the fourth output value; then:
determining that the first pixel is not defective.

23. The method of claim 21, further comprising:
if the value of the first pixel is higher than the second output value and the value of the second pixel is also higher than the second output value, determining that the second pixel is also defective;
if the value of the first pixel is lower than the fourth output value and the value of the fourth pixel is also lower than the fourth output value, determining that the fourth pixel is also defective.

24. The method of claim 21,
wherein one or more of the first function, the second function, the third function, and the fourth function are variable based at least in part on the gain of the sensor.

25. A system for determining if a pixel is defective, comprising:
an input for receiving a plurality of pixel values;
a memory, coupled to the input, for storing the plurality of pixel values; and
logic, coupled to the memory, configured to:
read a value of a first pixel from the memory;
read a highest value among nearest neighboring pixels to the first pixel from the memory, wherein the highest value is a value of a second pixel;
read a next highest value among the nearest neighboring pixels to the first pixel from the memory, wherein the next highest value is a value of a third pixel;
perform a first function on the value of the second pixel, wherein the first function produces a first output value;
if the value of the first pixel is higher than the first output value, determine that the first pixel is hot;
perform a second function on the value of the third pixel, wherein the second function produces a second output value;
if the value of the first pixel is higher than the second output value and the value of the second pixel is also higher than the second output value, determine that the first pixel is hot.

26. A system for determining if a pixel is defective, comprising:
an input for receiving a plurality of pixel values;
a memory, coupled to the input, for storing the plurality of pixel values; and
logic, coupled to the memory, configured to:
read a value of a first pixel from the memory;
read a lowest value among the nearest neighboring pixels to the first pixel from the memory, wherein the lowest value is a value of a second pixel;
read a next lowest value among the nearest neighboring pixels to the first pixel from the memory, wherein the next lowest value is a value of a third pixel;
perform a first function on the value of the second pixel, wherein the first function produces a first output value;
if the value of the first pixel is lower than the first output value, determine that the first pixel is cold;
perform a second function on the value of the third pixel, wherein the second function produces a second output value;
if the value of the first pixel is lower than the second output value and the value of the second pixel is lower than the second output value, determine that the first pixel is cold.

27. A non-transitory computer readable memory medium comprising program instructions for detecting defective pixels in a sensor, wherein the program instructions are executable to:
detect a plurality of pixel values, the plurality of pixel values comprising values of a first pixel and each nearest neighboring pixel to the first pixel;
store the plurality of pixel values; read a value of the first pixel;
read a highest value among nearest neighboring pixels to the first pixel, wherein the highest value is a value of a second pixel;
read a next highest value among the nearest neighboring pixels to the first pixel, wherein the next highest value is a value of a third pixel;
perform a first function on the value of the second pixel, wherein the first function produces a first output value;
if the value of the first pixel is higher than the first output value, determine that the first pixel is hot; perform a second function on the value of the third pixel, wherein the second function produces a second output value;
if the value of the first pixel is higher than the second output value and the value of the second pixel is also higher than the second output value, determine that the first pixel is hot.

28. A non-transitory computer readable memory medium comprising program instructions for detecting defective pixels in a sensor, wherein the program instructions are executable to:
detect a plurality of pixel values, the plurality of pixel values comprising values of a first pixel and each nearest neighboring pixel to the first pixel;
store the plurality of pixel values; read a value of the first pixel; read a lowest value among the nearest neighboring pixels to the first pixel, wherein the lowest value is a value of a second pixel;
read a next lowest value among the nearest neighboring pixels to the first pixel, wherein the next lowest value is a value of a third pixel;
perform a first function on the value of the second pixel, wherein the first function produces a first output value;
if the value of the first pixel is lower than the first output value, determine that the first pixel is cold;
perform a second function on the value of the third pixel, wherein the second function produces a second output value;
if the value of the first pixel is lower than the second output value and the value of the second pixel is lower than the second output value, determine that the first pixel is cold.

29. A camera, comprising:
an image sensor which senses a plurality of pixels;
a memory coupled to the image sensor;
logic coupled to the image sensor and the memory, wherein the logic is configured to:
- detect a plurality of pixel values of at least a subset of the plurality of light-sensitive pixels, the plurality of pixel values comprising values of a first pixel and each nearest neighboring pixel to the first pixel;
- store the plurality of pixel values in the memory;
- read a value of the first pixel from the memory;
- read a highest value among nearest neighboring pixels to the first pixel from the memory, wherein the highest value is a value of a second pixel;
- read a next highest value among the nearest neighboring pixels to the first pixel from the memory, wherein the next highest value is a value of a third pixel;
- perform a first function on the value of the second pixel, wherein the first function produces a first output value;
- if the value of the first pixel is higher than the first output value, determine that the first pixel is hot;
- perform a second function on the value of the third pixel, wherein the second function produces a second output value;
- if the value of the first pixel is higher than the second output value and the value of the second pixel is also higher than the second output value, determine that the first pixel is hot.

30. A camera, comprising:
an image sensor which senses a plurality of pixels;
a memory coupled to the image sensor;
logic coupled to the image sensor and the memory, wherein the logic is configured to:
- detect a plurality of pixel values of at least a subset of the plurality of light-sensitive pixels, the plurality of pixel values comprising values of a first pixel and each nearest neighboring pixel to the first pixel;
- store the plurality of pixel values in the memory;
- read a value of the first pixel from the memory;
- read a lowest value among the nearest neighboring pixels to the first pixel from the memory, wherein the lowest value is a value of a second pixel;
- read a next lowest value among the nearest neighboring pixels to the first pixel from the memory, wherein the next lowest value is a value of a third pixel;
- perform a first function on the value of the second pixel, wherein the first function produces a first output value;
- if the value of the first pixel is lower than the first output value, determine that the first pixel is cold;
- perform a second function on the value of the third pixel, wherein the second function produces a second output value;
- if the value of the first pixel is lower than the second output value and the value of the second pixel is lower than the second output value, determine that the first pixel is cold.

* * * * *